(12) United States Patent
Maxwell

(10) Patent No.: US 6,250,353 B1
(45) Date of Patent: Jun. 26, 2001

(54) ON/OFF ROAD TREAD FOR A TIRE

(75) Inventor: Paul Bryan Maxwell, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/421,610

(22) Filed: Oct. 20, 1999

(51) Int. Cl.⁷ .................. B60C 11/11; B60C 107/00; B60C 121/00
(52) U.S. Cl. .................. 152/209.15; 152/209.16; 152/209.18; 152/902
(58) Field of Search .................. 152/209.1, 209.11, 152/209.12, 209.15, 209.16, 209.18, 902; D12/138, 146, 149, 152

(56) References Cited

U.S. PATENT DOCUMENTS

| | | | |
|---|---|---|---|
| D. 222,899 | * | 1/1972 | Hawkinson . |
| D. 313,386 | | 1/1991 | Goto et al. .................. D12/147 |
| D. 385,239 | | 10/1997 | Bonko .................. D12/146 |
| D. 400,141 | | 10/1998 | Maxwell .................. D12/149 |
| D. 403,625 | | 1/1999 | Ratliff, Jr. .................. D12/141 |
| D. 412,475 | * | 8/1999 | Maxwell et al. .................. D12/149 |
| D. 413,288 | * | 8/1999 | Brown et al. .................. D12/147 |
| 3,645,314 | * | 2/1972 | Verdier .................. 152/902 |
| 4,383,568 | | 5/1983 | Pieper .................. 152/209 R |
| 4,702,292 | | 10/1987 | Brayer .................. 152/209 R |
| 5,085,259 | * | 2/1992 | Goergen et al. .................. 152/902 |
| 5,088,535 | | 2/1992 | Potts et al. .................. 152/209.15 |
| 5,109,903 | * | 5/1992 | Watanabe et al. .................. 152/209.15 |
| 6,189,586 | * | 2/2001 | Guidry .................. 152/9.02 |

FOREIGN PATENT DOCUMENTS

| | | | |
|---|---|---|---|
| 755137 | * | 8/1956 | (GB) .................. 152/209.18 |
| 2-189206 | * | 7/1990 | (JP) .................. 152/209.11 |

* cited by examiner

Primary Examiner—Steven D. Maki
(74) Attorney, Agent, or Firm—David L King

(57) ABSTRACT

A tread (20) for a pneumatic tire (10) has three distinct traction elements (40, 42, 44) arranged in three circumferential extending rows (2, 4, 6). The middle row (4) has a chevron-shaped traction element (42) oriented in an alternating pattern where a truncated apex (43) and an open end (50) are oriented facing the tread shoulders (24, 26). The two shoulder rows (2, 6) each have a plurality of two distinctly differentially-shaped, laterally extending lugs (40, 44), a first laterally extending shoulder lug (40) which has a narrow axially inner end (41) adjacent an open end (50) of the chevron-shaped traction element (42) and a second laterally extending shoulder lug (44) which has an enlarged axially inner end (45) aligned circumferentially with the truncated apex (43).

7 Claims, 6 Drawing Sheets

ON/OFF ROAD TREAD FOR A TIRE

TECHNICAL FIELD

This invention relates to a radial pneumatic light truck or automobile tire. More particularly, the tire has a tread designed for both on or off road applications.

BACKGROUND OF THE INVENTION

With the continuing rise in popularity of light trucks, vans and four-wheel drive sport utility vehicles, there exists a need to provide tires that have the ability to be driven on paved roads without excessive noise yet also to be capable of being driven in heavy snow or off paved roads in soft sand or muddy soil. Often these tires will be driven in flooded or wet roadway conditions. As an added condition, these multipurpose traction demands for the tire must be coupled with excellent tread wear.

Historically, tires have been able to meet one or two of the above-referenced design requirements but usually at the sacrifice of the other design features.

Snow tires and off road tires could achieve good traction usually by opening the tread pattern and providing large block type tread elements. These tires generally were very noisy and had poor tread wear when driven at highway speeds on paved roads. The WRANGLER MT® disclosed in U.S. Pat. No. 4,823,855 is an example of the aggressive style tread pattern needed for aggressive off road applications.

A latter developed asymmetric non-directional tire was developed for the light truck and sport utility vehicles called the WRANGLER GSA®. This tire employed a unique triple traction feature that provides excellent uniform wear across the tread pattern regardless of the wheel position. The tire has good noise, and more than adequate traction in a variety of conditions such as snow, off road, and on road wet or dry. The tread pattern disclosed in U.S. Pat. No. 5,415,215 was one of the first truly multipurpose tires for these types of vehicles. The WRANGLER GSA® tire has been commercially very successful.

From that tire, a superior wet traction tire was developed employing two wide aquachannels in combination with the triple traction feature. The tire has been entitled the WRANGLER AQUATRED® and it is disclosed in U.S. Pat. No. 5,658,404. This tire demonstrated that deep water traction could be enhanced without sacrificing the wear and other performance features of the original WRANGLER GSA® tire.

The WRANGLER AQUATRED® demonstrated that while the all around performance of these light truck and sport utility vehicle tires must be very good, some drivers still have special needs or concerns requiring the more specialized type tire performance in one or more feature.

There has been a continual trade-off in attempting to increase the aggressive off road and snow tractive performance of the these tires while maintaining the tread wear durability and good ride performance constraints.

The invention disclosed in this patent application teaches a novel tread that is both good riding and long wearing while also achieving excellent off road traction.

DISCLOSURE OF THE INVENTION

Summary of the Invention

A tread (20) for a pneumatic tire (10) is disclosed. The tread (20) has a plurality of traction elements (40, 42, 44) arranged in three circumferentially extending rows (2, 4, 6); a middle row (4), a first shoulder row (2), and a second shoulder row (6).

The middle row (4) has a plurality of chevron-shaped traction elements (42) having a truncated apex (43). Each chevron-shaped traction element (42) alternates in orientation circumferentially around the tread (20).

Each shoulder row (2, 6) has a pair of laterally extending shoulder traction elements (40, 44). The traction elements (40) are a first laterally extending shoulder lug (40) having an elongated length relative to the width. The first laterally extending shoulder lug (40) has a narrow axially inner end (41) circumferentially aligned with the truncated apex (43) of the chevron-shaped traction element (42) and extending toward and adjacent to an open end (50) of the chevron-shaped traction element (42). Preferably, the narrow end (41) of the laterally extending shoulder lug (40) slopes radially inwardly to the inner tread surface (22) and extends axially about halfway into the open end (50) of the chevron-shaped traction element (42).

The traction elements (44) are a second laterally extending shoulder lug (44) having a elongated length relative to the width. The second laterally extending lug (44) has an enlarged axially inner end (45). The enlarged axially inner end (45) is circumferentially aligned with and extends toward and is adjacent the truncated apex (43) of chevron-shaped traction element. Preferably, the enlarged axially inner end (45) has a laterally extending semi-blind groove (60) bisecting the enlarged axially inner end (45).

Preferably, the first shoulder row (2) and the second shoulder row (6) have the laterally extending shoulder lugs (40, 44) circumferentially alternating around the tread (20) with the lugs (40) of the first shoulder row (2) being circumferentially offset with the lugs (40) of the second shoulder row (6). The lugs (44) are circumferentially aligned with the lugs (40) of the opposite shoulder row (2, 6). Most preferably, the lugs (40, 44) and the chevron-shaped traction element (42) are circumferentially aligned such that a line (70) bisecting each aligned lug (40, 44) and chevron-shaped traction element (42) is laterally extending.

DEFINITIONS

Figure 1:
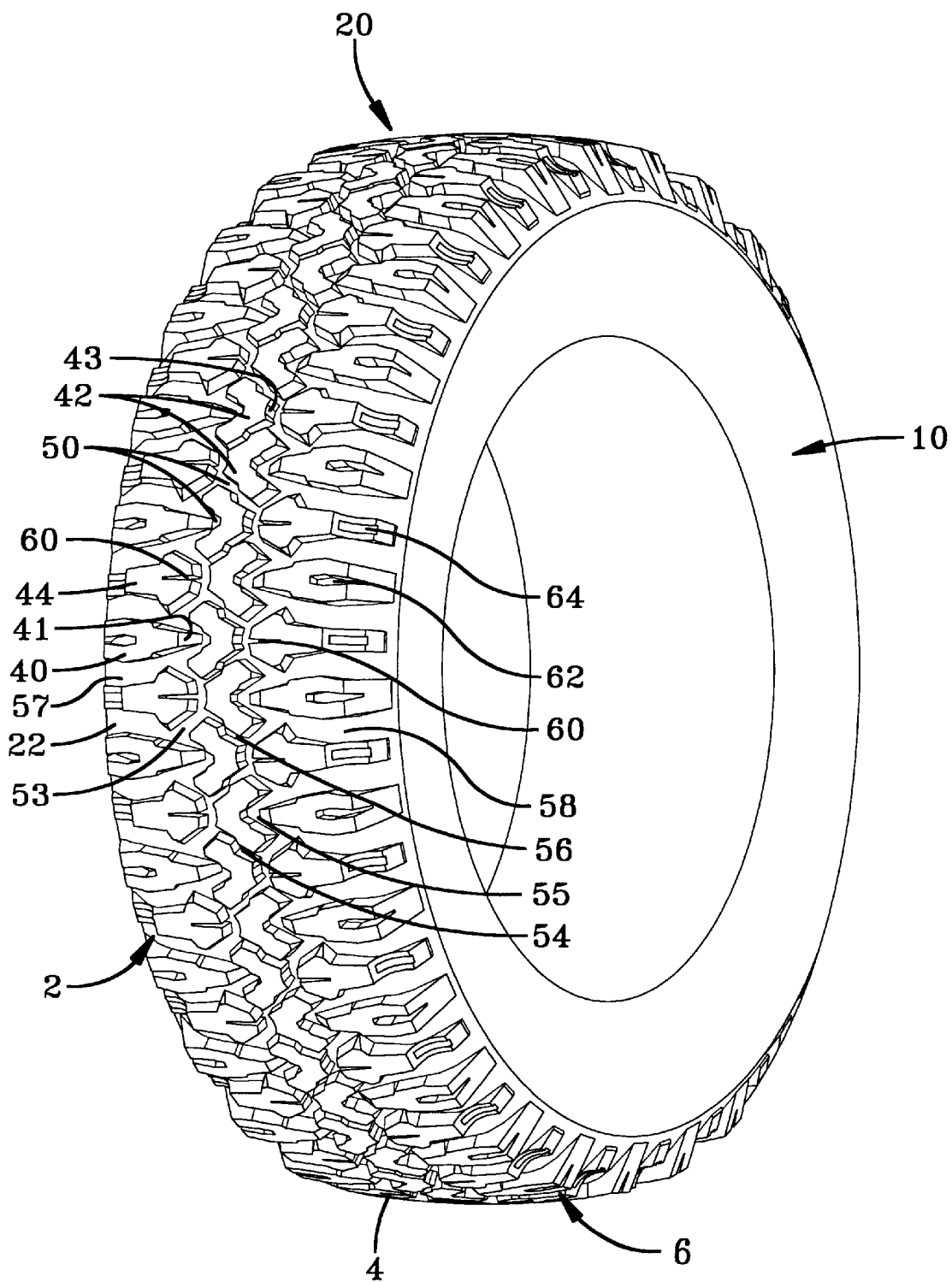
FIG. 1 is a perspective view of the tire according to a preferred embodiment of the invention.
Figure 2:
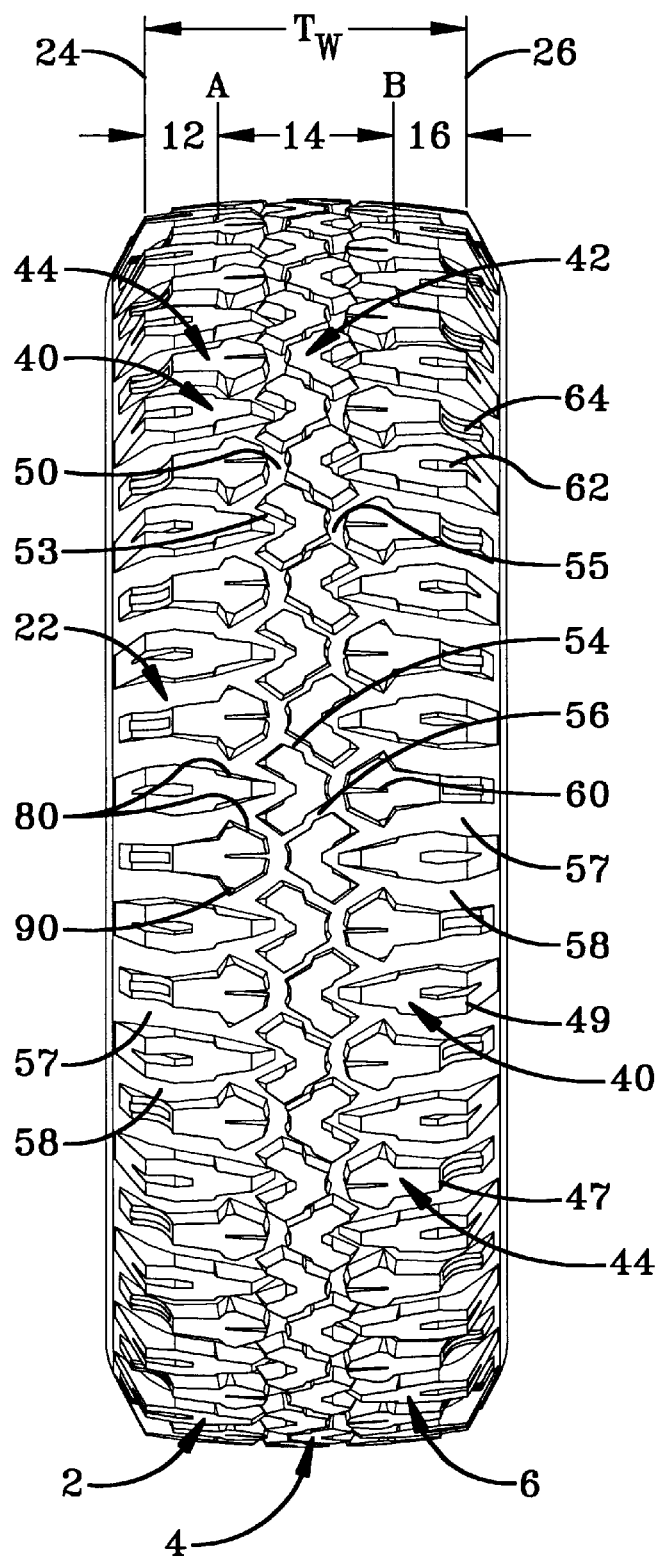
FIG. 2 is a plan view of the tire of FIG. 1.
Figure 3:
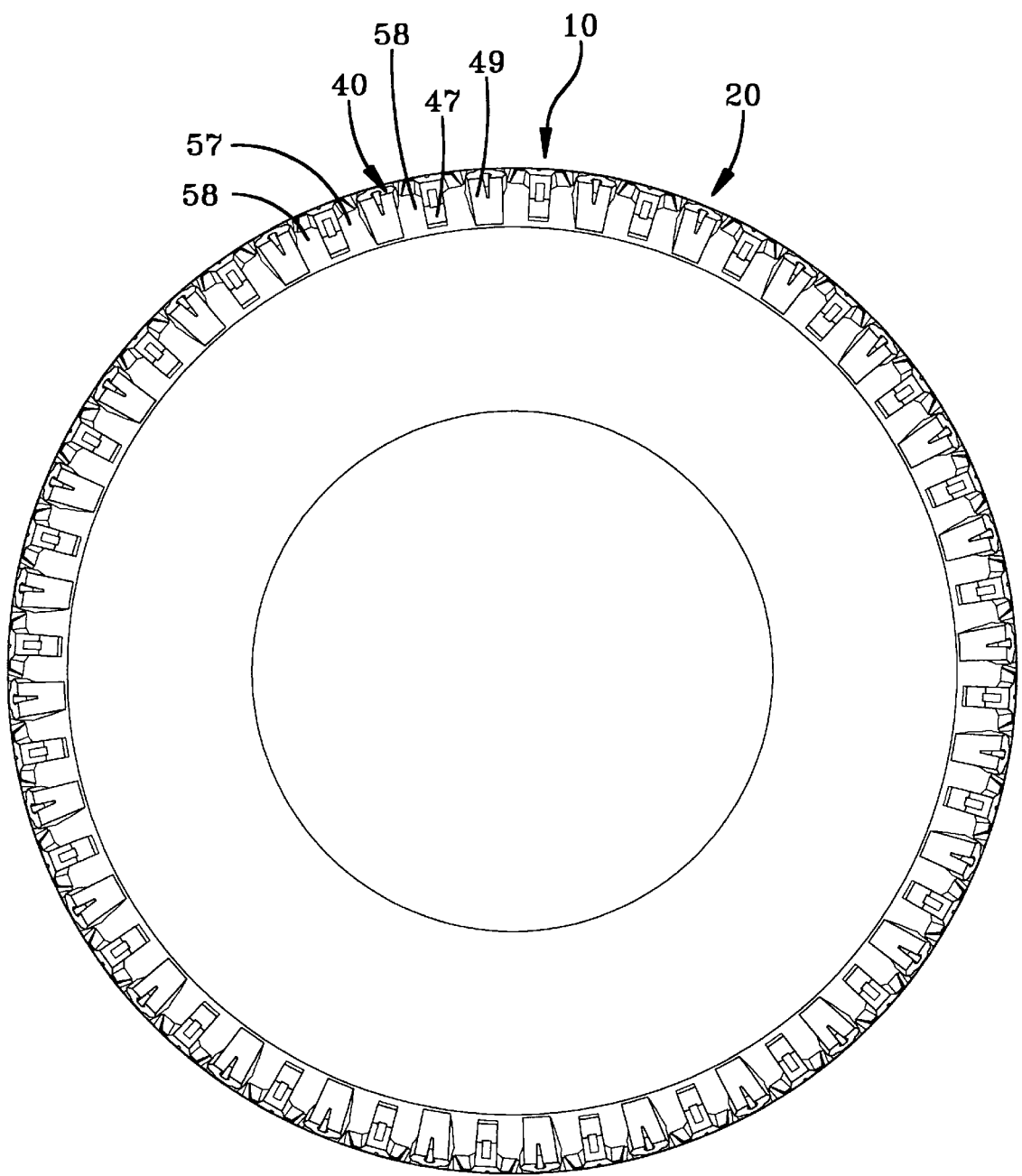
FIG. 3 is a side view of the tire of FIG. 1.
Figure 4:
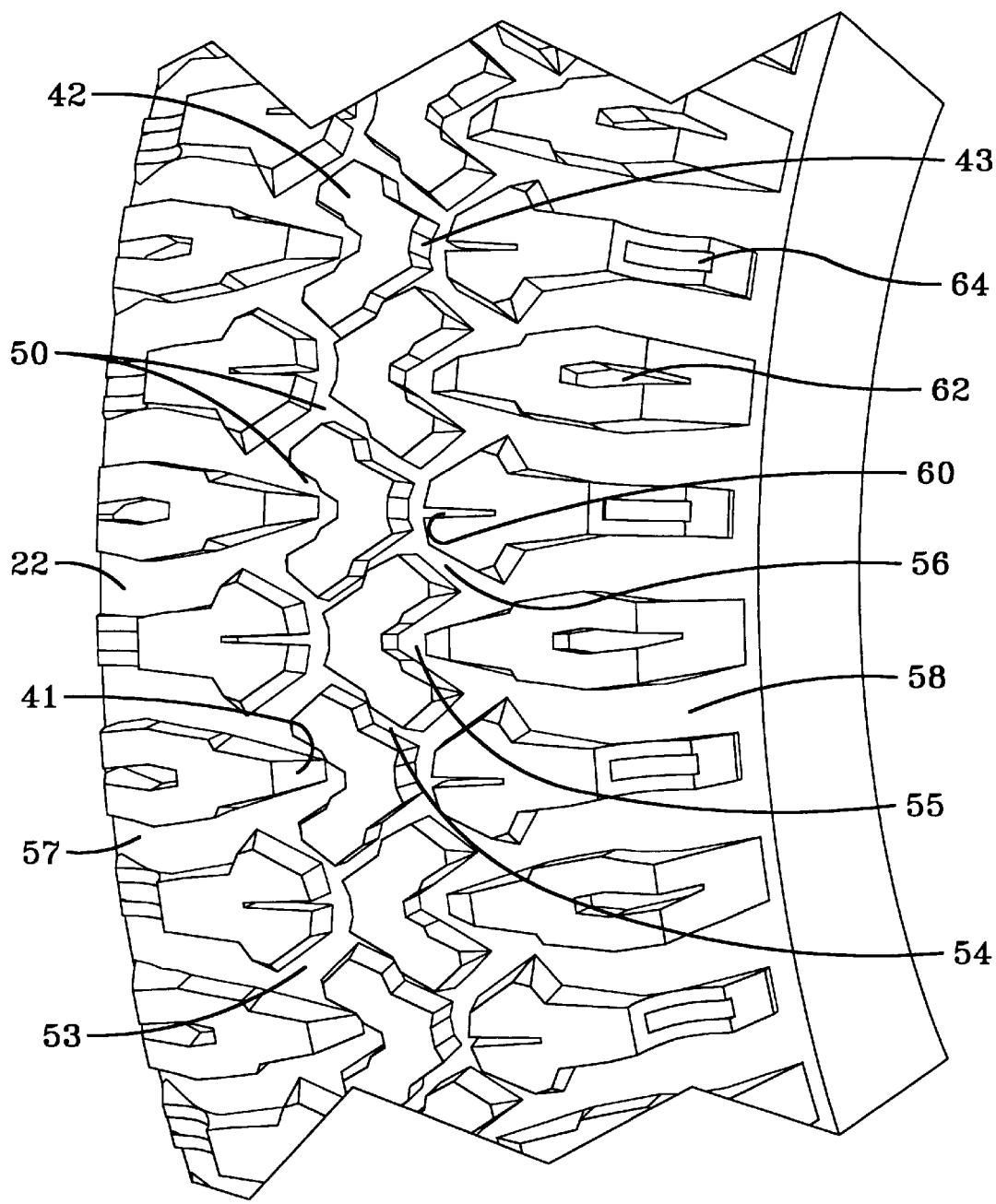
FIG. 4 is an enlarged fragmentary view of the tire of FIG. 2.

For ease of understanding this disclosure the following terms are disclosed:

"Aspect ratio" of the tire means the ratio of its section height ($S_H$) to its section width ($S_W$) multiplied by 100% for expression as a percentage.

"Asymmetric tread" means a tread that has a tread pattern not symmetrical about the centerplane or equatorial plane EP of the tire.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Inboard side" means the side of the tire nearest the vehicle when the tire is mounted on a wheel and the wheel is mounted on the vehicle.

"Lateral" means an axial direction.

"Net contact area" means the total area of ground contacting elements between defined boundary edges divided by the gross area between the boundary edges as measured around the entire circumference of the tread.

"Net-to-gross ratio" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning. "Axial" and "axially" means lines or directions that are parallel to the axis of rotation of the tire.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction.

"Tread element" or "traction element" means a rib, lug or a block element.

DETAILED DESCRIPTION OF THE INVENTION

With the reference to FIGS. 1–6, a tire (10) having a tread (20) according to a preferred embodiment of the present invention is shown. The tread (20) when configured annularly has an axis of rotation R, first and second lateral edges (24, 26).

The tread (20) has a plurality of ground engaging traction elements (40, 42, 44) separated by circumferential grooves (53, 54, 55, 56) and lateral grooves (57, 58). Each traction element (42) extends radially outwardly from a tread base (22) to a radially outer surface. The lateral grooves (57, 58) may intersect the circumferential grooves and join to form a continuous lateral groove path across the entire tread width. Preferably, the lateral grooves (57, 58) may begin in the center of the tread at ends which are laterally or circumferentially spaced and never connecting, except that they may meet at a common circumferential groove (53, 55). The traction elements (42) as shown are chevron-shaped traction elements. The tread (20), as illustrated in FIGS. 1–6, has an overall or total net-to-gross ratio of about 60% measured from tread lateral edge (24) to tread lateral edge (26). It is believed that the tire (10) can be successfully produced with treads (20) having low total or overall net-to-gross ratios between 40% and 70%, preferably 45% to 65%.

The tread (20) is divided laterally into three tread zones, (12, 14, 16). The middle zone (14) is positioned between the axially outer portion of the enlarged lug end (45) of the lug (44) on each tread half. The first shoulder zone (12) is located between the first lateral edge (24) and the enlarged lug end (45) of a lug (44) of the first row (2). The second shoulder tread zone (16) is located between the second lateral edge (26) and the enlarged lug end (45) of the lug (44) of the second row (6). The first or second shoulder tread zones (12, 16) are intended to be mounted on either the outer or outboard side of the vehicle (not shown) or on the inboard side. The first and second shoulder tread zones (12, 16) preferably have a net contact area less than the net contact area of the middle zone (14). Each tread zone is defined as the area between specified boundary edges. The middle zone (14) has boundary edges defined by two planes (A, B), one plane (A) passes through the axially outer portion of each enlarged axially inner end (45) of the shoulder lug (44) located closer to the tread lateral edge (24), plane β being similarly situated but closer to tread lateral edge (26).

The first shoulder zone (12) lies between the lateral edge (24) and the plane (A).

The second shoulder zone (16) lies between the lateral edge (26) and the plane (B). The axial width of the shoulder zones (12, 16) are less than 30% of the overall tread width ($T_W$), while the middle zone has an axial width of at least 40% or greater of the overall tread width ($T_W$).

As shown, the circumferentially adjacent and alternating oriented chevrons (42) of the middle row (4) has the truncated apex (43) located axially inward of most of the open portions (50) of the oppositely oriented and circumferentially adjacent chevrons (42). The combination of the truncated apex (43) and the portions of the two circumferentially adjacent chevrons (42) envelope at least one half of the enlarged axially inner ends (45) of the second laterally extending shoulder lugs (44).

The combination of the middle row (4) of chevron-shaped traction elements (42) and the shoulder rows (2, 6) of laterally extending first laterally extending shoulder lug (40) and the second laterally extending shoulder lug (44) form three circumferentially aligned traction elements (40, 42, 44) having a first laterally extending shoulder lug (40), a middle chevron-shaped traction element (42) and a second laterally extending shoulder lug (44), respectively extending from a first tread shoulder or edge (24) to the opposite second tread shoulder or edge (26), the circumferentially adjacent lugs (40, 44) and chevron (42) are arranged from the first tread shoulder or edge (24) to the second tread shoulder or edge (26) with the second lug (44) being in closer proximity to the first shoulder or first lateral edge (24) and the first lug (40) being adjacent to the second lateral edge (26).

As illustrated, the second shoulder lugs (44) have an axially outer end (47) offset axially inwardly of the axially outer end (49) of the lugs (40).

Figure 5:
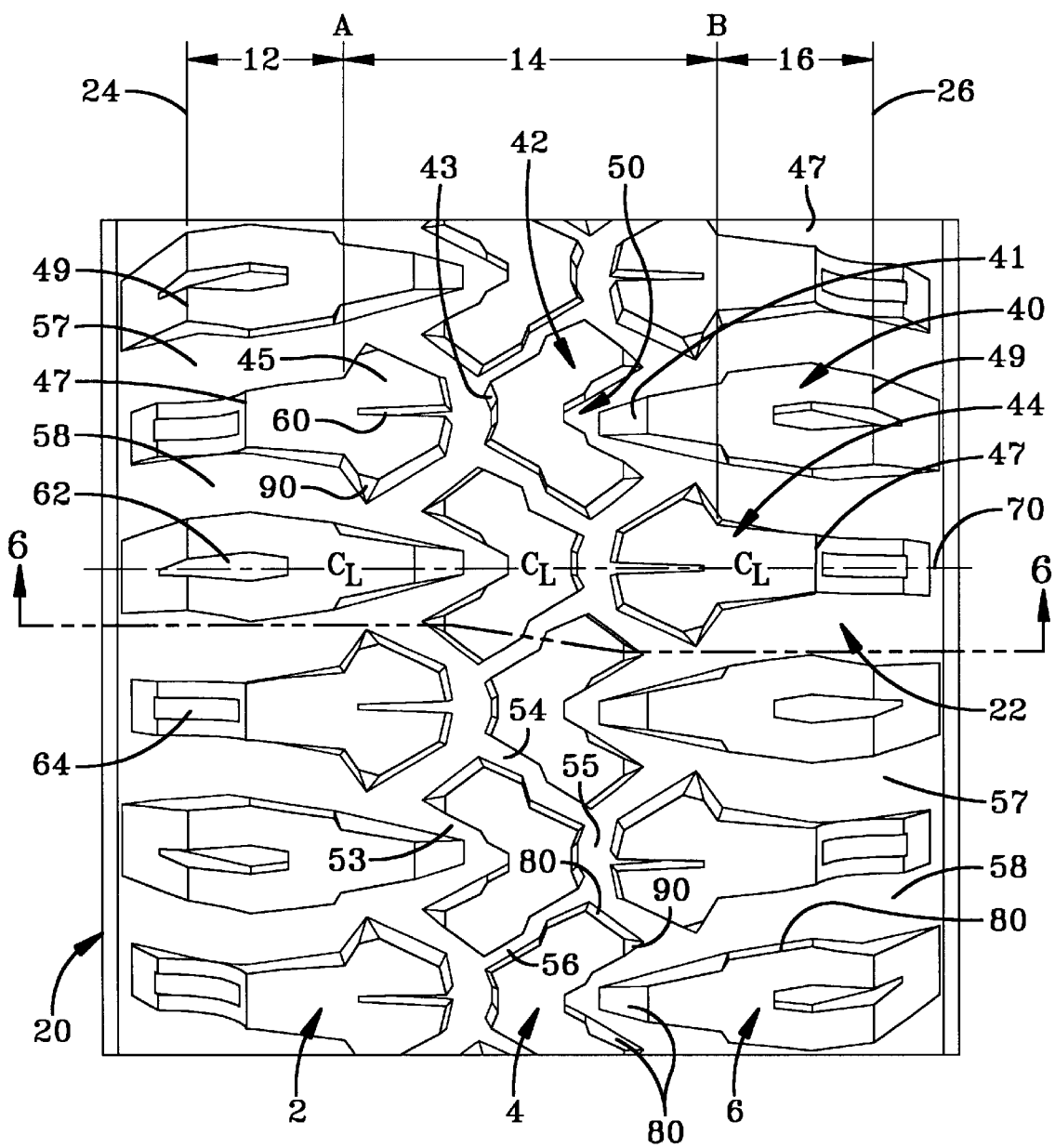
FIG. 5 is an enlarged fragmentary plan view of the tread of FIG. 2.
Figure 6:
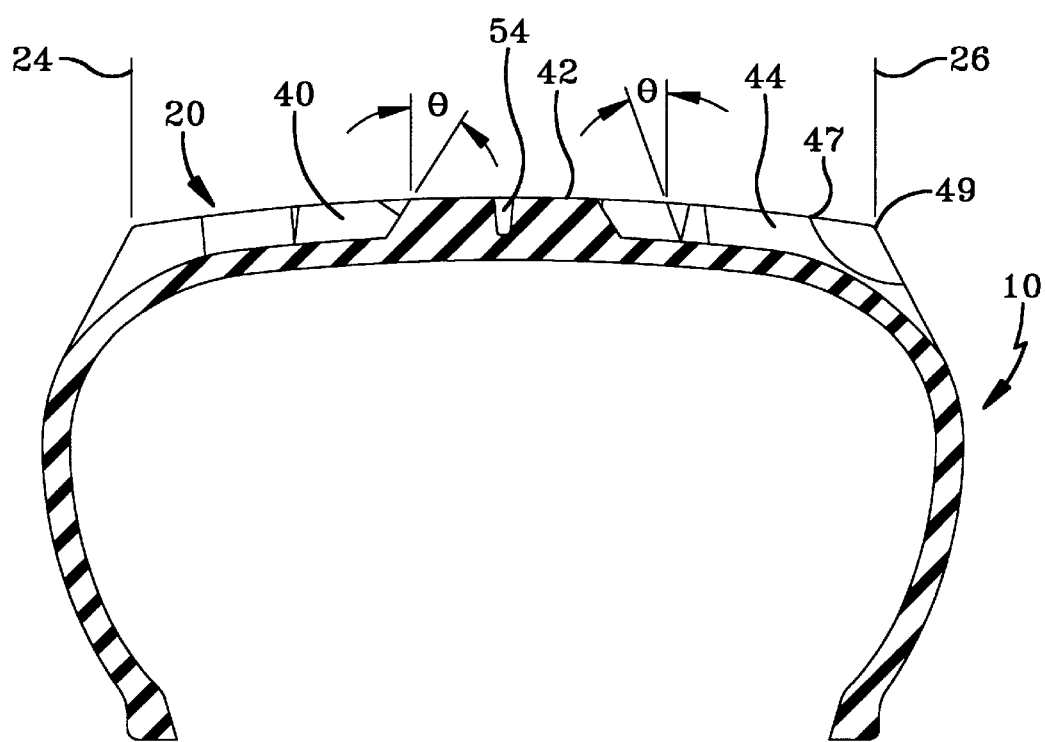
FIG. 6 is a cross-sectional view of the tire taken along line 6—6 of FIG. 5.

Interestingly, as shown in FIG. 5, the lugs (40, 44) and the chevron-shaped traction elements (42) are circumferentially aligned such that a centerline ($C_L$) bisecting each element (40, 42, 44) are circumferentially aligned. That is an axial straight line (70) extending from the first lateral edge (24) to the second lateral edge and through each of the centerlines ($C_L$) of the lugs (40, 42, 44) can be drawn in each repeating pattern of the three traction elements (40, 42, 44).

Another beneficial feature of the tread (20) is that the sides (80) of the elements (40, 42, 44) extending radially from the tread base (22) to a radially outer edge of the element is inclined at a large angle θ in locations where the sides (80) face oppositely to or is part of an axially inner end (41) of the lug (40) or the sides (80) face oppositely to or is part of an axially inner end (45) of the lug (44). Thus, the sides (80) of truncated apex (43) and the sides (80) adjacent the open end (50) of the chevron-shaped traction elements (42) are inclined at the angle θ, θ being at least 20° inclined relative to the radial direction, preferably about 30°. Also, as illustrated, the corners (90) where the sides (80) are generously sloped and intersect, preferably are chamfered.

The combination of chamfered corners (90) and sloping sides (80) buttress the elements (40, 42, 44) increasing the stiffness of the tread (20), particularly in the middle tread zone (14) as shown. This feature enables the tread (20) to increase the net area in the center region of the tread as the tread wears. This increasing net area retards treadwear in the center region of the tread.

In the shoulder regions, the sharper angled sides enhance traction in soft, wet, or snowy conditions.

In the shoulder lugs (40), a blind groove (62) laterally bisects the axially outer portion of the lug (40) adjacent each lateral edge (24, 26). In the shoulder lug (44), a shallow depth semi-blind groove (64) bisects the axially outer portion of the lug (44) adjacent the lateral edges (24, 26). Also, the enlarged axially inner end (45) of lug (44) has a semi-blind groove (60) bisecting laterally the end (45). Each of these features provide additional edges to enhance traction but also increases the flexibility of the lugs (40, 44) in the circumferential direction which enhances ride performance and traction.

Although not illustrated, it is understood that the tread pattern may employ a pitched pattern to improve noise dampering, if so desired.

The sloping narrow inner end (41) creates a very open tread void area in the central portion of the tread (20) which facilitates the tread from becoming packed with mud in this portion of the tread, as well as the other areas having the generously sloped sides (80).

The tread (20), as illustrated, has excellent ride characteristics due in part to the amount of tread in road contact, particularly in the center of the tread.

What is claimed is:

1. A tread for a pneumatic tire, the tread having a plurality of traction elements arranged in three circumferentially repeating rows; a middle row, and a first shoulder row and a second shoulder row, the tread characterized in that the middle row has chevron-shaped elements having a truncated apex, each adjacent chevron-shaped traction element alternating in orientation circumferentially around the tread, each shoulder row has a pair of laterally extending shoulder lugs; a first laterally extending shoulder lug having a narrow axially inner end directed circumferentially aligned with the truncated apex of the chevron and extending toward and adjacent to an open end of the chevron, and a second laterally extending shoulder lug having an enlarged axially inner end circumferentially aligned with and extending toward and adjacent to the truncated apex of the chevron and, wherein the first laterally extending shoulder lug has the narrow axially inner end sloping radially inwardly to a location at least halfway into the open end of the chevron.

2. The tread of claim 1 wherein the second laterally extending shoulder lug has a laterally extending semi-blind groove bisecting the enlarged axially inner end.

3. The tread of claim 1 wherein the circumferentially adjacent and alternating oriented chevrons of the middle row has the truncated apex axially inward of the adjacent end of the oppositely oriented chevron, the combination of a truncated apex of one chevron and the open end portions of the two circumferentially adjacent chevrons enveloping at least one-half of the enlarged axially inner end of the second laterally extending shoulder lug.

4. The tread of claim 3 wherein the combination of the middle row of chevron-shaped traction elements and the first and second shoulder rows of laterally extending shoulder lugs form three circumferentially aligned traction elements having a first lateral extending shoulder lug, a middle chevron-shaped traction element and a second laterally extending shoulder lug, respectively extending from a first tread shoulder to the opposite second tread shoulder, the circumferentially adjacent lugs being arranged from the first tread shoulder to the second tread shoulder with a second laterally extending shoulder lug, middle chevron lug and a first laterally extending lug, respectively, in a repeating alternating pattern.

5. The tread of claim 1 wherein axially outer ends of the shoulder lugs are axially offset, the outer ends of the second laterally extending shoulder lugs being axially inward of the axially outer end of the first laterally extending shoulder lugs.

6. The tread of claim 1 wherein the tread has a tread width ($T_W$), the tread width having a middle portion (M) defined by the planes (A) and planes (B) passing through axially outer portions of the enlarged lug heads of the second laterally extending shoulder lugs, and a first shoulder portion extending from the first tread shoulder to the plane (A) and a second shoulder portion extending from the second shoulder to the plane (B), the middle portion being at least 40% of the tread width while the shoulder portions are each less than 30% of the tread width.

7. The tread of claim 6 wherein the net-to-gross ratio of the middle portion is greater than 50% and the net-to-gross ratio of the shoulder portions is less than 40%.

* * * * *